US005715309A

United States Patent [19]
Bartkowiak

[11] Patent Number: 5,715,309
[45] Date of Patent: Feb. 3, 1998

[54] CONVERSION OF COMPRESSED SPEECH CODES BETWEEN ATTENUATED AND UNATTENUATED FORMATS

[75] Inventor: John G. Bartkowiak, Travis County, Tex.

[73] Assignee: Advanced Micro Devices, Inc., Sunnyvale, Calif.

[21] Appl. No.: 397,907

[22] Filed: Mar. 3, 1995

[51] Int. Cl.$^6$ .................................................. H04M 9/08
[52] U.S. Cl. .................... 379/390; 379/339; 379/388; 379/409; 379/395; 395/2.94
[58] Field of Search .................... 379/388, 389, 379/390, 58, 395, 165, 93, 94, 374, 338, 339; 370/110.1, 84, 112, 109; 375/27; 395/2.94, 2.95, 2.21, 2.91

[56] References Cited

U.S. PATENT DOCUMENTS

| | | | |
|---|---|---|---|
| 3,688,097 | 8/1972 | Montgomery | 235/152 |
| 4,181,970 | 1/1980 | Izumi et al. | 364/760 |
| 4,648,108 | 3/1987 | Ellis et al. | 379/202 |
| 4,715,063 | 12/1987 | Haddad et al. | 379/390 |
| 4,741,018 | 4/1988 | Potratz et al. | 379/58 |
| 4,796,287 | 1/1989 | Reesor et al. | 379/390 |
| 4,887,288 | 12/1989 | Erving | 379/389 |
| 4,901,346 | 2/1990 | Erving | 379/389 |
| 4,959,857 | 9/1990 | Erving et al. | 379/390 |
| 4,979,163 | 12/1990 | Erving et al. | 370/288 |
| 4,993,022 | 2/1991 | Kondo et al. | 370/79 |
| 5,007,046 | 4/1991 | Erving et al. | 370/249 |
| 5,029,162 | 7/1991 | Epps | 370/77 |
| 5,187,741 | 2/1993 | Erving et al. | 379/388 |
| 5,224,151 | 6/1993 | Bowen et al. | 379/58 |
| 5,239,542 | 8/1993 | Breidenstein et al. | 370/79 |
| 5,243,342 | 9/1993 | Kattemalalavadi et al. | 375/25 |
| 5,347,544 | 9/1994 | Garcia et al. | 375/36 |
| 5,495,529 | 2/1996 | Honda | 379/395 |
| 5,515,432 | 5/1996 | Rasmusson | 379/388 |

FOREIGN PATENT DOCUMENTS

A-364383 4/1990 European Pat. Off. .
A-3332305 4/1985 Germany .
A-2208983 4/1989 United Kingdom .

OTHER PUBLICATIONS

Busala, A. "Fundamental Considerations in the Design of a Voice–Switched Speakerphone"; The Bell System Technical Journal; vol. 39, No. 2, Mar. 1960.
W. Krafft: "Digitales Freisprechen: ISDN Komfort freihandig nutzen" Siemens Telecom Report, vol. 12, No.3, May 1989, pp. 90–93.

Primary Examiner—Krista M. Zele
Assistant Examiner—Jacques M. Saint-Surin
Attorney, Agent, or Firm—Stanford & Bennett, L.L.P.

[57] ABSTRACT

A conversion system using a lookup table of adjustment values for converting non-linear, logarithmic pcm codes between attenuated and unattenuated formats. A computer accesses attenuated pcm codes from a compression device, such as that found in the transmit portion of a digital speakerphone, and retrieves an adjustment value from the lookup table using the measured pcm code and a gain code. The gain code corresponds to a gain setting asserted by the computer to a gain device in the transmit portion of the speakerphone. The lookup table is preferably implemented in hardware, such as a ROM, RAM, PLA or similar type device, or is implemented in software or firmware executed by the computer. The retrieved adjustment value is added to the attenuated pcm code to determine the corresponding unattenuated pcm code. The present invention is also applicable for the reverse process for calculating attenuated pcm codes from the corresponding unattenuated pcm codes, where a separate lookup table is used for the reverse process. The reverse process is used, for example, to derive the attenuated pcm code equivalents at the output of a receive gain device in a speakerphone by measuring the unattenuated pcm code received from a digital subscriber loop. The calculated values for the transmit and receive cases are used in equations for purposes of acoustic calibration, switching functions, echo cancellation and the like. The lookup tables are substantially reduced for lower performance applications to determine rough estimates for the calculations.

41 Claims, 6 Drawing Sheets

CONVERSION OF COMPRESSED SPEECH CODES BETWEEN ATTENUATED AND UNATTENUATED FORMATS

FIELD OF THE INVENTION

The present invention relates to audio communication systems, and more particularly to conversion of compressed speech codes for performing speakerphone functions in digital subscriber loops.

DESCRIPTION OF THE RELATED ART

Conventional analog speakerphones are well known and are described in an article by A. Busala, "Fundamental Considerations in the Design of a Voice-Switched Speakerphone," Bell Systems Technical Journal, volume 39, no. 2, March 1960, pp. 265–294. Improvements of the basic speakerphone device are described in a series of related patents, all of which are hereby incorporated by reference, including U.S. Pat. No. 4,887,288, entitled "Self Calibration Arrangement for a Voice-Switched Speakerphone" issued Dec. 12, 1989 by Erving, describing a self-calibration arrangement for updating thresholds to determine the appropriate state of three possible operating states for the speakerphone; U.S. Pat. No. 4,901,346, entitled "Computer Controlled Speakerphone for Adapting to a Communication Line" issued Feb. 13, 1990 by Erving, describing the measurement of the degree of hybrid reflection for determining the amount of switched loss in the transmitted and the received speech paths to maintain stability and for improving communication; U.S. Pat. No. 4,979,163 entitled "Echo Suppression Arrangement for an Adaptive Speakerphone," issued Dec. 18, 1990 by Erving, describing an echo suppression arrangement to compensate for a reverberant effect that occurs during operation in near, full or full duplex mode; U.S. Pat. No. 4,959,857 entitled "Acoustic Calibration Arrangement for a Voice-Switched Speakerphone" issued Sep. 25, 1990 by Erving et al, describing a calibration circuit for emitting tone bursts through a loudspeaker for determining the acoustic characteristics of the operating environment of the speakerphone; and U.S. Pat. No. 5,007,046 entitled "Computer Controlled Adaptive Speakerphone" issued Apr. 9, 1991 to Erving, describing dynamic adjustment of switching thresholds and other performance parameters based on the analysis of the acoustic environment and telephone line conditions. Another related patent, U.S. Pat. No. 5,187,741 entitled "Enhanced Acoustic Calibration Procedure for a Voice-Switched Speakerphone" issued Feb. 16, 1993 to Erving is also incorporated by reference and describes a method for determining the type of acoustic environment for both large and small rooms having either harsh or favorable acoustic characteristics.

The analog speakerphones described in the Erring patents listed above generally perform the three primary functions of speech processing, including sampling and quantizing the analog speech waveform and also compressing the speech input in a nonlinear manner, such as logarithmic compression. FIG. 1 is a simplified block diagram illustrating a generalized communication path in a typical analog speakerphone according to prior art, where this generalized path represents both the receive and transmit paths. In general, an analog voice or speech signal is provided to an envelope or absolute value detector 100 and also to a programmable attenuator 102. The output of the programmable attenuator 102 is asserted on an analog phone line or otherwise amplified and coupled to a loudspeaker. The speech signal passes through the envelope detector 100 and is provided to a logarithmic amplifier 104 for expanding the dynamic range of the speakerphone to approximately 60 dB for following the envelope of the speech signal. The output of the logarithmic amplifier 104 is provided to an analog to digital (A/D) converter 106 for converting the logarithmic analog signals to digital values, which are then provided to a computer 108. The computer 108 typically includes an 8-bit microcontroller or the like, such as one of the 8051 family of microcontrollers by the Intel Corporation (Intel). The computer 108 controls the speakerphone operating conditions and parameters and preferably includes an appropriate user interface, as desired.

The digital signals provided to the computer 108 are continuously monitored and analyzed to provide a control signal to the programmable attenuator 102 for inserting the appropriate amount of loss for the most efficient operation depending upon operating conditions. For example, referring to the Erving patents, the signal and noise levels of both the transmit and receive paths are continuously monitored by the computer. It is desired to know the speech signal levels both before and after the analog programmable attenuators in the transmit and receive paths to track the loop gain of the circuit. These measured and calculated values are used to derive signal, noise and expected averages for the purposes of performing calibration, determining switching conditions and for echo suppression, among other functions. One of the primary advantages of the methods disclosed by the Erving patents lies in the ability to perform calculations in the logarithmic decimal domain so that multiplication and division of numbers becomes addition and subtraction, respectively, thereby simplifying computations performed by the computer.

It is becoming more common in the industry to use a standard coder/decoder (CODEC) arrangement for speakerphone technology using digital subscriber loops. The incoming signal is digitized or otherwise quantized using an A/D converter. The transmit and receive gain or attenuator amplifiers typically include digital multiplying circuits rather than analog programmable attenuators. Rather than using a decimal domain logarithmic amplifier to perform non-uniform quantization, most systems today use a piecewise linear approximation to the logarithmic compression characteristic for generating pulse code modulation (pcm) codes, which are transmitted and received in digital subscriber loop. The piecewise linear approximations include a μ-law compression characteristic commonly used in North America and the A-law characteristic commonly used in Europe. The μ-law compression characteristic is defined by the following equation:

$$y = y_{max} \frac{\ln[1 + \mu(|x|/x_{max})]}{\ln(1 + \mu)} \operatorname{sgn} x$$

where sgn x=+1 for x≥0 and −1 for x<0, where μ is a positive constant typically between 0 and 255, x and y represent input and output voltages and $x_{max}$ and $y_{max}$ are the maximum positive excursions of the input and output voltages, respectively. The standard value for μ is 255, where μ=0 corresponds to linear amplification (uniform quantization). The A-law characteristic is defined by the following equation:

$$y = \begin{cases} y_{max} \dfrac{A(|x|/x_{max})}{1+\ln A} \operatorname{sgn} x & 0 < \dfrac{|x|}{x_{max}} \leq \dfrac{1}{A} \\ y_{max} \dfrac{1+\ln[A(|x|/x_{max})]}{1+\ln A} \operatorname{sgn} x & \dfrac{1}{A} < \dfrac{|x|}{x_{max}} < 1 \end{cases}$$

where A is a positive constant and the values x, y, $x_{max}$ and $y_{max}$ are analogous to the parameters defined for the μ-law case. A standard value for A is 87.6. In a digital CODEC arrangement, the computer typically receives the A-law or μ-law values from the transmitter portion or otherwise provides the A-law or μ-law values to an A-law or μ-law expander in the receiver portion of the subscriber loop.

A primary function in subscriber loops is to measure attenuated or unattenuated values in both the transmitter and receiver portions of the loop and to derive the corresponding unattenuated or attenuated signal levels, respectively. The gain factor of each programmable attenuator is usually readily available to the computer since these values are provided from the computer itself. However, the effect of conversion from normal to compressed format and vice-versa must also be determined. Although additional hardware could be provided to access both the attenuated and unattenuated values, this would overly complicate the hardware. It is desired to use a simple 8-bit microcontroller device to achieve low cost and to maintain compatibility with the existing substantial development work based on the microcontroller. A more complicated configuration would require twice the number of cycles and thus twice the time and would also double the memory required to store the corresponding signals. Furthermore, a computer device such as a microcontroller would have to convert from the μ-law or A-law log domain in either software or in the microcontroller requiring additional firmware and hardware on the digital CODEC.

Another method for recovering signal values in the μ-law or A-law pcm formats is to divide the values by a maximum value to convert to a normalized format and then to multiply the result by a gain factor, where the gain factor is provided as a fractional integer value. However, this method would necessitate converting the pcm codes to linear 13-bit integer format, multiplying the normalized format by the programmed gain and then reconverting the result into the appropriate μ-law or A-law pcm code format. This procedure would obviously require considerable computation involving multiplication and some method of calculating inverse natural logarithms.

It is desired to maintain or otherwise improve the performance of digital subscriber loops for determining loop gain in the transmit path for deriving unattenuated or attenuated logarithmic values for purposes of threshold adjustment and calibration without the necessity of complicated hardware or software.

SUMMARY OF THE INVENTION

According to the present invention, μ-law or A-law pcm codes are converted between attenuated and unattenuated format using a lookup table of predetermined adjustment values and a gain code corresponding to the fractional integer setting of the gain. In one embodiment, a computer accesses the pcm signals after attenuation and determines the unattenuated pcm codes using the measured pcm codes and corresponding gain codes to cross reference an adjustment value from a lookup table. The adjustment value is then added to the attenuated pcm code to calculate the unattenuated pcm code. Alternatively, the computer measures the unattenuated pcm codes and determines the corresponding attenuated pcm codes using the gain codes and a similar lookup table to retrieve an adjustment value, which is subtracted from the unattenuated pcm code. The lookup tables are reducible depending upon the performance desired.

The quantization intervals between the adjustment values within the lookup table are tailored to the performance of the particular application. For typical speakerphone applications, a lookup table is provided for sixteen preset gain settings, although any other number of gain settings are contemplated depending upon the particular application and performance desired. The gain values are preferably based on 8-bit integer values representing gain settings in approximately 2.5 decibel steps. In this manner, for each gain setting from the lookup table, there is provided a precalculated pcm code where the gain setting is applied and a pcm code or unattenuated value where gain setting is not applied. If total recovery of the original signal is required, the lookup table would include all possible values, which for sixteen gain settings and 128 μ-law pcm magnitude codes is 2048 values.

It has been determined, however, that considerable redundancy exists in a lookup table with a separate value for each gain setting and corresponding pcm code. Thus, in alternative embodiments of the present invention, the number of table values are reduced by separating the pcm codes into signal ranges. Such reduced tables provide recovered measurements with good intelligibility. A reduced version of the table including only 79 entries also produces good intelligibility and is easily implemented in a programmable logic array (PLA), a read-only memory (ROM), a random access memory (RAM), or similar hardware device, or provided directly in software. The adjustment values in the table are further reduced to a difference of differences format, so that each value may be represented as a 4-bit number. In one embodiment according to the present invention, an adder circuit is employed to retrieve consecutive values from the table, where the retrieved values are added together to obtain the adjustment value.

For even lower performance applications, a single column of entries is employed for providing a very crude measure of the unattenuated signal. This measure provides an acceptable performance for the calculations of the signal averages desired for purposes of threshold modification and calibration. The same methodology is employed to perform the process in either direction, where the lookup table is employed to obtain adjustment values which are added to, or otherwise subtracted from, the attenuated signal pcm codes or the unattenuated pcm codes, respectively. In this manner, attenuated or unattenuated speech values are recovered from the use of lookup tables, where the size of the lookup table is modified based upon the performance desired. The calculated results are then used to obtain loop gain and signal, noise and expected average transmit and receive values in a similar manner described in the Erving patents for purposes of acoustic calibration, switching functions, echo cancellation, etc.

Therefore, a system and method is disclosed for converting pcm codes between attenuated and unattenuated values by employing simple 8-bit arithmetic and reduced lookup tables to avoid using log pcm/linear conversions, multiplications, inverse natural logarithms and considerable computation on the part of a computer. Furthermore, since a system according to the present invention recovers unattenuated pcm codes from attenuated codes, unattenuated speech is easily resynthesized from the attenuated version with reasonable intelligibility using simple hardware and software overhead.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 2:
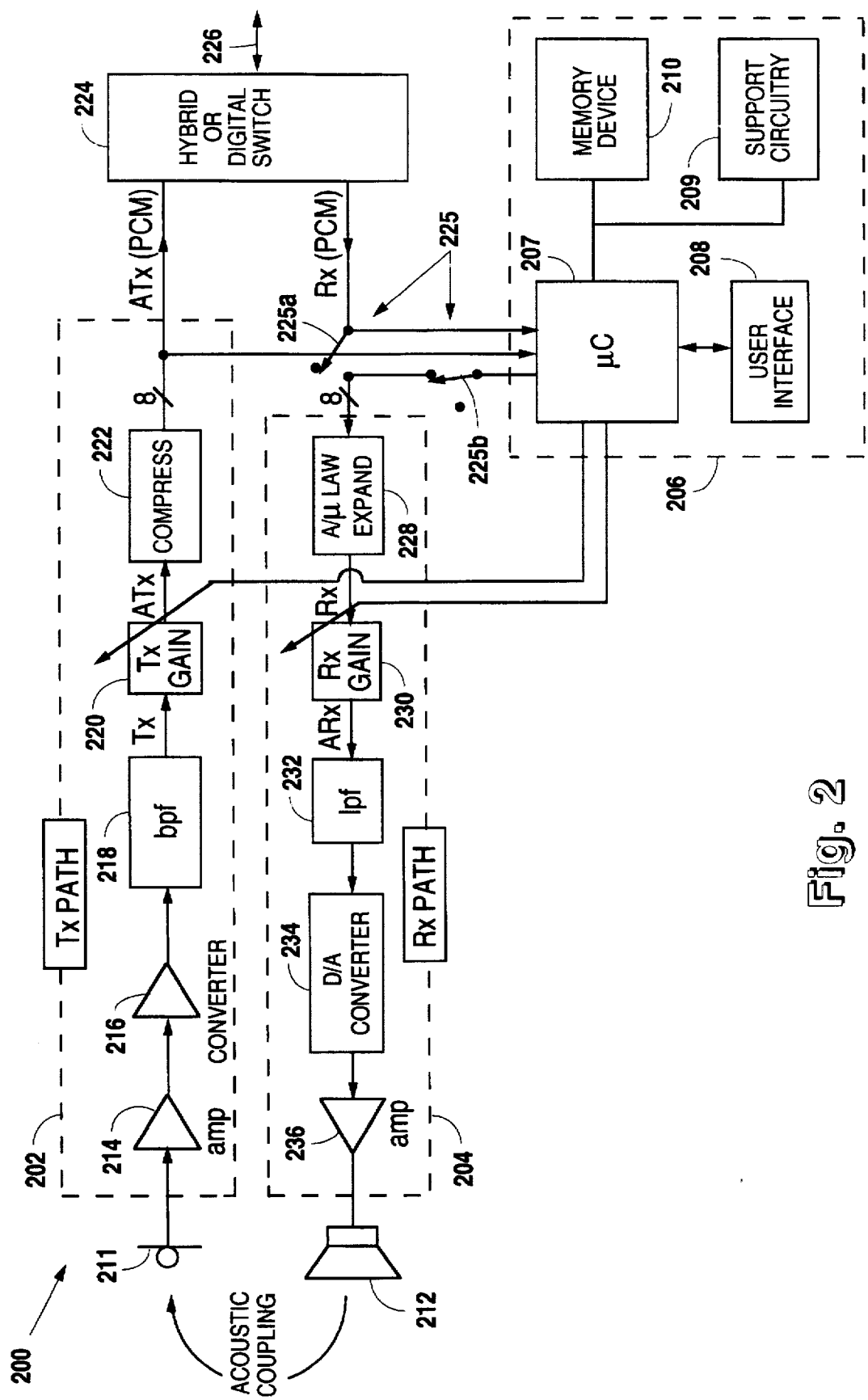
FIG. 2 is a simplified block diagram of a digital speakerphone implemented according to the present invention.

Referring now to FIG. 2, a general speakerphone circuit 200 implemented according to the present invention is shown which employs an industry standard coder/decoder (CODEC) arrangement and a computer-controlled adaptive gain circuit. The speakerphone circuit 200 is an example of an adaptive speakerphone application for a digital subscriber loop, where 8-bit digital μ-law or A-law log pulse-code modulated (pcm) codes are transmitted to or received from an all-digital subscriber loop. In digital CODECs, μ-law or A-law log signal representations are more readily available to perform calculations than signals in the log decimal domain. Also, the signal path gain adjustments in digital CODECs are preferably performed in the digital signal processing domain using 8–16 bit coefficients employed by a digital multiplying circuit, rather than being performed on the analog speech signals in the analog domain using an analog programmable attenuator. The present invention concerns the ability to perform calculations in the μ-law or A-law domain such that multiplication and division of numbers becomes addition and subtraction, respectively.

In particular, the speakerphone circuit 200 generally includes a transmit section 202, a receive section 204 and a computer 206. The computer 206 preferably includes an 8-bit microcontroller 207 or the like, such as one of the 8051 family of microcontrollers, which is further coupled to an optional user interface 208, as desired. The micro controller 207 is also connected to support circuitry 209 as needed, and to a memory device 210 for storing predetermined adjustment values according to the present invention. The memory device 210 may be implemented in hardware in any one of many ways known to those skilled in the art, such as a read only memory (ROM), a programmable logic array (PLA), a random access memory (RAM) device, etc. However, it is also possible that a lookup table according to the present invention may be implemented in software or firmware, although such software/firmware implementation would typically be stored in a hardware memory device of some sort downloaded from magnetic media, such as a floppy or hard disk.

A microphone 211 couples audio signals to the transmit section 202 and a speaker 212 receives output audio signals from the receive section 204. Within the transmit section 202, audio signals from the microphone 211 are provided to the input of a programmable analog preamplifier 214 for providing amplified audio signals to the input of an analog-to-digital (A/D) converter 216. The A/D converter 216 samples the audio signals at a specified frequency and at certain quantized or discrete levels for providing digital signals. The digital signals from the A/D converter 216 are provided to a bandpass filter (BPF) 218 for providing unattenuated digital signals, referred to as Tx, to a transmit gain block 220. The A/D converter 216 preferably samples the audio signals at a relatively high rate, such as 512 kHz, for example. The BPF 218 preferably comprises a series of decimators for rejecting DC and 50–60 Hz line frequencies while also preferably reducing the sampling rate to a lower level, such as 8 kHz. The unattenuated linear signals Tx from the BPF 218 are normally in binary digital format having 13 to 16 bits of accuracy. The transmit gain block 220 is preferably a digital multiplier device which adjusts the gain by multiplying the Tx signals by an 8 to 16 bit coefficient having a decimal equivalent in the range of 0–1. This multiplication is usually performed using fractional integer arithmetic or through a series of right shift and add functions. The gain of the transmit gain block 220 is set by the computer 206, which asserts a gain code value to the transmit gain block 220, as described more fully below.

The transmit gain block 220 develops attenuated linear digital signals, referred to as ATx, where the ATx signals are provided to a compression unit 222 for converting the ATx signals to non-linear pulse code modulation (pcm) codes, referred to as ATx(pcm), for transmission on a digital subscriber loop. The compression unit 222 generally performs logarithmic compression according to a piecewise linear approximation, referred to as A-law or μ-law, for converting the ATx signals to the attenuated pcm codes ATx(pcm). The ATx(pcm) codes are provided to either a hybrid coupler or a digital switch 224, which transmits the ATx(pcm) codes along a conductor 226, generally comprising a two wire or twisted pair of conductors, to a digital subscriber loop (not shown).

Non-linear pcm codes transmitted by a remote subscriber device and received by the digital subscriber loop are asserted on the conductors 226 to the digital switch 224, which provides the received pcm codes, referred to as Rx(pcm), to one pole 225a of a double-pole double throw switch 225 and to the computer 206. The computer 206 asserts output pcm codes to the other pole 225b of the switch 225. The switch 225 provides Rx(pcm) codes to the receiver section 204 from the digital switch 224 in one position or from the computer 206 in the other position. The receiver section 204 generally performs analogous functions as those performed by the transmit section 202. In particular, the received non-linear pcm codes Rx(pcm) are provided to an expander unit 228, which performs the opposite function as the compression unit 222 by performing an inverse logarithmic expansion according to the A-law or μ-law compression characteristic. The combined function of the compression unit 222 and the expander unit 228 is generally referred to as companding as known to those skilled in the art. The expanded linear digital signals from the expander unit 228, referred to as Rx, are provided to a receiver gain block 230, which has a gain determined by a digital gain code asserted by the computer 206 in a similar manner as described for the transmit gain block 220. The receiver gain block 230 is preferably a digital multiplier similar to the transmit gain block 220, which attenuates the digital signals provided from the expander unit 228 through a series of right shifts and add functions. The attenuated linear digital signals from the receiver gain block 230, referred to as ARx, are provided to the input of a low pass filter (LPF) 232, which preferably comprises a series of interpolators for increasing the sampling frequency for conversion to analog. The output signals of the LPF 232 are provided to a digital-to-analog (D/A) converter 234 for converting the linear digital signals to analog audio signals, which are provided to the input of an amplifier/coupler 236. The amplifier/coupler 236 amplifies and further couples the audio signals to a loudspeaker 212.

The present invention is illustrated for the µ-law case, it being understood that the same principles apply for the A-law case by simple extrapolation. Also, since the speakerphone algorithm calculations typically use the absolute value of logarithmic signals, this disclosure is confined to positive signals, it being understood that the present invention is not limited to positive signals and may equally be applied to negative signals or a combination of positive and negative signals. The transmit case will be described first. For purposes of the present invention, the µ-law compression standard or µ-law companding characteristic performed by the compression unit 222 is given by the following equation (1):

$$ATx\,(pcm) = sgn\,(x)\,\frac{\ln(1+\mu|x|)}{\ln(1+\mu)} \qquad \text{Equation (1)}$$

where:

ATx (pcm) is the compressed and attenuated output pcm code;

x is the normalized input signal of ATx (between −1 and +1);

µ is the compression parameter, which is preferably 255; and sgn(x) is the sign (±) of x.

For example, for a 13-bit linear signal in the range between from −8192 to +8191, where the input ATx signal is +4096, the compressed output value is calculated as $$ATx\,(pcm) = sgn\,(x)\,\frac{\ln\left(1+255\left(\frac{4096}{8191}\right)\right)}{\ln(256)} = 0.875_{10}$$

where $0.875_{10}$ (decimal) is converted to an 8-bit fractional binary representation $01110000_2$, where the most significant bit is a sign bit. This binary value converts to a decimal representation of 112 (based on 7-bit) in practice. For purposes of transmission, the bits are inverted by the digital subscriber loop, so that in the µ-law case, the sign bit and the 7 magnitude bits for the above example are inverted to the binary code $10001111_2$. The particular transmit protocol, however, is beyond the scope of the present disclosure.

It is desired to find the pcm code equivalent Tx(pcm) of the unattenuated transmit signal Tx at the output of the BPF 218 from the attenuated pcm codes ATx(pcm) measured at the output of the compression unit 222. One method for recovering the signal value Tx in µ-law pcm format from the values monitored at the output of the compression unit 222 is to use equation (1) where the normalized signal x is given by the following equation (2):

$$x = \frac{Tx}{8191}\,(gain) \qquad \text{Equation (2)}$$

where Tx is the signal value in 13-bit integer format provided by the BPF 218, and gain is the fractional integer gain value or gain setting provided by the microcontroller 207. Thus, the microcontroller 207 could be implemented to retrieve the pcm code values ATx(pcm) from the compression unit 222 and derive attenuated or unattenuated Tx transmitter values using equations (1) and (2) above for Tx values ranging between 0 and 8191, where the normalized signal x calculated from equation (2) is plugged into equation (1). For the unattenuated codes, the gain setting in equation (2) could be ignored or otherwise set to 1. However, this method would necessitate considerable and rather complex conversions, which is undesirable for many applications. In particular, this method would necessitate the conversion of the attenuated pcm codes to linear format, use of Equation (2) to calculate Tx from x and the programmed gain, and finally, reconversion of Tx into µ-law (or A-law) log pcm code format. Such calculations would require considerable computation on the part of the microcontroller 207 involving multiplication and the capability to calculate inverse natural logarithms. It will be seen below that such complex calculations are not necessary for achieving the desired result if the present invention is employed.

According to the present invention, a lookup table of precalculated or predetermined adjustment values is used where the quantization intervals between the table values are tailored to the performance of the application. A rough measure of the transmit signal average value is desired at a given time "t", referred to as tx_ave$_t$, as represented by the following equations (3) and (4):

$$tx\_ave_t = tx\_ave_{t-1} + \frac{|Tx\,(pcm)| - tx\_ave_{t-1}}{4},\, \text{if}\,|Tx\,(pcm)| \geq tx\_ave_{t-1} \qquad \text{Equation (3)}$$

$$tx\_ave_t = tx\_ave_{t-1} + \frac{|Tx\,(pcm)| - tx\_ave_{t-1}}{32},\, \text{if}\,|Tx\,(pcm)| < tx\_ave_{t-1} \qquad \text{Equation (4)}$$

where |Tx(pcm)| is the absolute value of the unattenuated signal Tx in µ-law code format, and where tx_ave$_{t-1}$ is the transmit signal average at a prior time t−1. The increment in time between successive samples or between t−1 and t depends on the particular sampling rate, which is approximately 8 kHz in the embodiment shown. It is noted that equations (3) and (4) are typically not the only equations solved using the derived Tx(pcm) codes. In one embodiment according to the present invention, a lookup table of adjustment values is generated using 16 preset gain settings, where a gain of zero is not used. 16 gain settings are preferred corresponding to 16 gain codes since all gain codes are representable using 4-bit binary numbers. It is understood, however, that any number of gain settings may be used depending upon the particular application, where 16 is a convenient value providing sufficiently accurate results. For example, the 16 values of the gain coefficients using 8-bit integer values shown in the following Table 1 represent gain settings in roughly 2.5 decibel (dB) steps:

TABLE 1

Preferred Gain Settings

| Gain Setting GS | Integer Value (I) (I/256 = GS) | Gain Code | Hexadecimal Equivalent | Gain (dB) |
|---|---|---|---|---|
| 0.0078125 | 2 | 1 | 0 | −42 |
| 0.0156250 | 4 | 2 | 1 | −36 |
| 0.0234375 | 6 | 3 | 2 | −32.5 |
| 0.0312500 | 8 | 4 | 3 | −30 |
| 0.0390625 | 10 | 5 | 4 | −28 |
| 0.0546875 | 14 | 6 | 5 | −25 |
| 0.0703125 | 18 | 7 | 6 | −23 |
| 0.0903750 | 24 | 8 | 7 | −20.9 |
| 0.1328125 | 34 | 9 | 8 | −17.5 |
| 0.1718750 | 44 | 10 | 9 | −15 |
| 0.2345750 | 60 | 11 | A | −12.5 |
| 0.3125000 | 80 | 12 | B | −10 |
| 0.4218750 | 108 | 13 | C | −7.5 |
| 0.5625000 | 144 | 14 | D | −5 |
| 0.7500000 | 192 | 15 | E | −2.5 |
| 0.9921875 | 254 | 16 | F | 0 |

Figure 1:
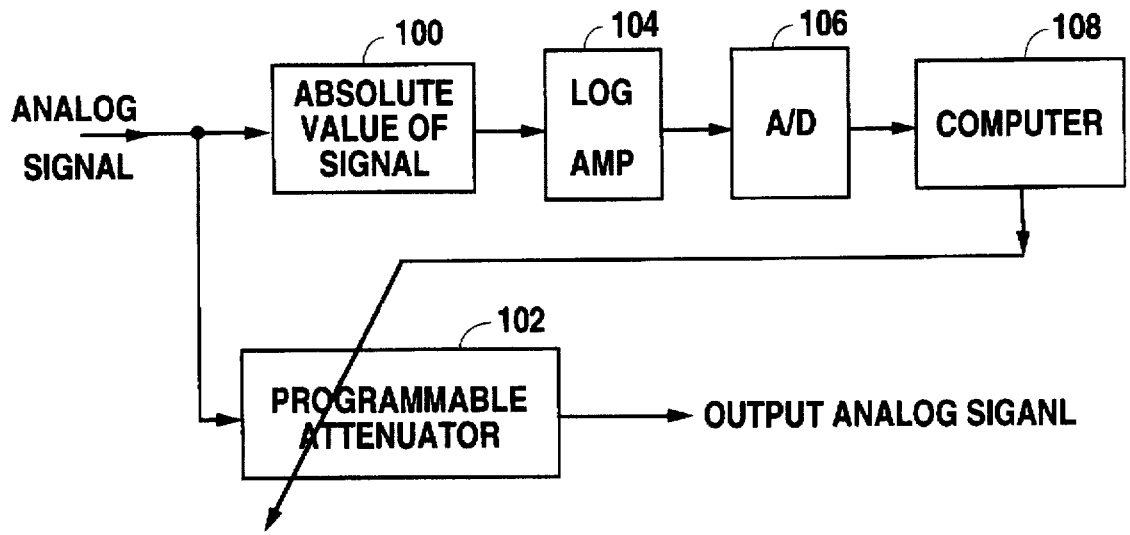
FIG. 1 is a simplified block diagram illustrating the communication path in a typical analog speakerphone according to prior art.
Figure 3:
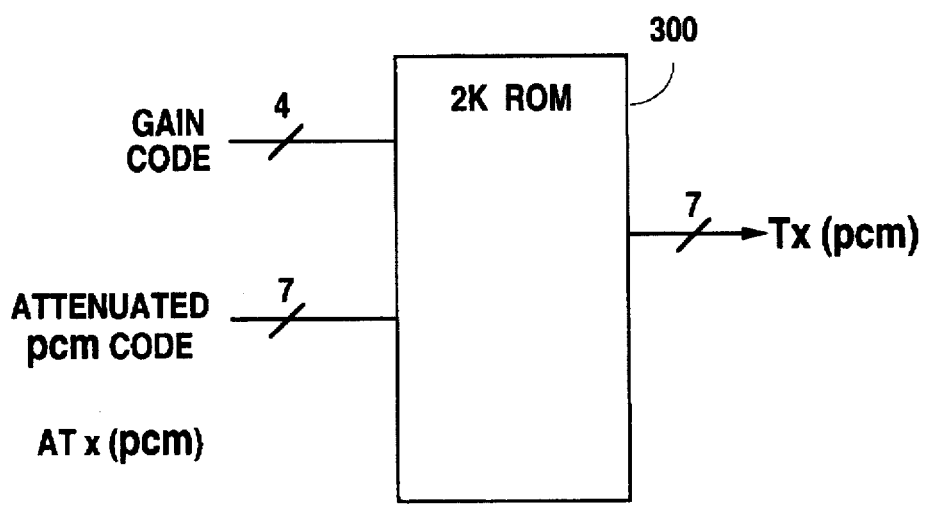
FIG. 3 is a schematic diagram of one embodiment of the memory device of FIG. 2.

It is known that linear signals in the range 0–8191 can be converted to 128 distinct pcm codes. Thus, if total recovery of the signal is required, each gain setting would have 128 pcm codes associated with it resulting in a look-up table of 16×128=2048 values. Each of these values are precalculated using the equations (1) and (2) above rather than having the microcontroller 207 compute the values during operation. The specific values are too numerous to repeat in this disclosure, although these values are readily calculated using the equations provided and then stored in the memory device 210. FIG. 3 illustrates a more particular implementation of the memory device 210 of FIG. 2, where a 2048×7 (or 8) bit ROM device (or 2 kbyte ROM) 300 receives an 11-bit address from the micro controller 210 and asserts a corresponding 7-bit unattenuated pcm code. The 11-bit address includes the hexadecimal equivalent of the 4-bit gain code from Table 1 and the 7-bit attenuated pcm code ATx(pcm) measured by the computer 206 at the output of the compression unit 222.

However, it has been determined that considerable redundancy exists in the contents of such a lookup table with over 2,000 entries and that for practical purposes, many of the table entries are not used. The following Table 2 was generated experimentally to remove much of the redundancy:

sub-ranges shown in the second of the upper rows of Table 2. The range limits are predominantly defined by bits 6–4, which is referred to as the chord value of the pcm code, and by bits 3–0, referred to as the step value when the chord value is 0. This provides more accurate values at the higher attenuation settings. To use Table 2, the entry in the row corresponding to the gain code and column corresponding to the measured ATx(pcm) code is the value that is added to the ATx(pcm) code to obtain the unattenuated pcm code Tx(pcm). For example, if the gain is set at code 6, which is setting 0.0546875, and the ATx(pcm) signal provided by the compression unit 222 is measured as "12", then the entry in Table 2 corresponding to these settings is in column "8–15" and row 6, which is the entry "48." The value 48 is an adjustment value that is added to the measured attenuated ATx(pcm) code to derive the unattenuated Tx(pcm) code as if no attenuation had been applied, or as though the gain were set to 0 dB. Thus, the unattenuated Tx(pcm) code is calculated as "12+48" which is "60".

The array of table entries in Table 2 represent the "mean" offset values for μ-law encoded pcm signals for each of the ranges shown, i.e., for the example given, if the signal which

TABLE 2

| μ-law Log pcm Gain Adjustment Table to Determine Unattenuated pcm Code | | | | | | | | | | | | |
|---|---|---|---|---|---|---|---|---|---|---|---|---|
| | chord value | 0 | | | | | 1 | 2 | 3 | 4 | 5 | 6 | 7 |
| | pcm input signal range [ATx (pcm)] | 0 | 1 | 2–3 | 4–7 | 8–15 | 16–31 | 32–47 | 48–63 | 64–79 | 80–95 | 96–111 | 112–127 |
| gain | gain code | pcm code adjustments | | | | | | | | | | | |
| 0.0078125 | 1  | 18 | 47 | 66 | 81 | 92 | 100 | + | + | + | + | + | + |
| 0.0156250 | 2  | 12 | 34 | 51 | 66 | 76 | 85  | 90 | + | + | + | + | + |
| 0.0234375 | 3  | 9  | 27 | 42 | 56 | 67 | 76  | 82 | + | + | + | + | + |
| 0.0312500 | 4  | 8  | 24 | 38 | 51 | 61 | 70  | 76 | 78 | + | + | + | + |
| 0.0390625 | 5  | 7  | 20 | 33 | 45 | 55 | 65  | 71 | 73 | + | + | + | + |
| 0.0546875 | 6  | 5  | 15 | 27 | 39 | 48 | 57  | 63 | 66 | + | + | + | + |
| 0.0703125 | 7  | *  | 8  | 23 | 34 | 46 | 52  | 57 | 59 | 60 | + | + | + |
| 0.0937500 | 8  | *  | 7  | 19 | 28 | 37 | 45  | 51 | 53 | 54 | + | + | + |
| 0.1328125 | 9  | *  | 5  | 14 | 23 | 30 | 38  | 43 | 45 | 46 | + | + | + |
| 0.1718750 | 10 | *  | *  | 8  | 19 | 25 | 32  | 37 | 39 | 40 | 41 | + | + |
| 0.2343750 | 11 | *  | *  | 5  | 14 | 20 | 26  | 30 | 32 | 33 | 34 | + | + |
| 0.3125000 | 12 | *  | *  | *  | 7  | 15 | 21  | 24 | 26 | 26 | 27 | 27 | + |
| 0.4218750 | 13 | *  | *  | *  | 5  | 10 | 15  | 18 | 19 | 19 | 20 | 20 | + |
| 0.5625000 | 14 | *  | *  | *  | *  | 5  | 10  | 11 | 12 | 13 | 13 | 14 | 14 |
| 0.7500000 | 15 | *  | *  | *  | *  | 2  | 4   | 6  | 6  | 7  | 7  | 7  | 7 |
| 0.9921875 | 16 | *  | *  | *  | *  | 1  | 1   | 1  | 1  | 1  | 1  | 1  | 1 |

Each of the gain values from Table 1 are repeated in the first column of Table 2 and are designated with gain codes from 1 to 16 for simplicity, although they are easily converted to a range 0 to 15 (0 to F hexadecimal) for binary format. There are no entries in the lower attenuation settings and lower signal codes in Table 2, where the values in this area are marked using an asterisk (*) symbol. For practical purposes, these values are not needed. However, the lesser of the first two values found in the previous row and subsequent column, respectively, is used, if a value is desired. For example, any signal recovered in the pcm range 0–3 for gain code 12, has the same mean offset as signals in the range 4–7, which is 7. Likewise, for gain code 15 corresponding to gain setting 0.75, a pcm code adjustment of 2 would be used. Similarly, there were no codes measured at the higher attenuation settings and higher signal codes (marked +). For example, during experiments all pcm signals measured at the output of the compression unit 222 in FIG. 2 for gain code 1 or gain setting 0.0078125, fell in the range 0–31. Thus, the higher values are not necessary.

The pcm code range 1–127 corresponding to the linear signals in the range 0–8191 is further divided into 12 is attenuated by 0.0546875 lies in the range "8–15", the average difference between the attenuated and unattenuated signal is "48". The following Table 3 illustrates the accuracy of reconstructing pcm signals in the given range in the example for that attenuation setting as compared to the known true unattenuated code:

TABLE 3

| Accuracy Table for Attenuation Setting 6 and pcm Code in Range "8–15" | | | |
|---|---|---|---|
| Attenuated Signal pcm Code | Table Offset Entry | Recovered pcm Code | True Unattenuated Code |
| 8  | 48 | 48 + 8 = 56  | 52–53 |
| 9  | 48 | 48 + 9 = 57  | 54–55 |
| 10 | 48 | 48 + 10 = 58 | 56–58 |
| 11 | 48 | 48 + 11 = 59 | 59–60 |
| 12 | 48 | 48 + 12 = 60 | 61–62 |
| 13 | 48 | 48 + 13 = 61 | 63–64 |

TABLE 3-continued

Accuracy Table for Attenuation Setting 6 and pcm Code in Range "8–15"

| Attenuated Signal pcm Code | Table Offset Entry | Recovered pcm Code | True Unattenuated Code |
|---|---|---|---|
| 14 | 48 | 48 + 14 = 62 | 65 |
| 15 | 48 | 48 + 15 = 63 | 66 |

Table 3 illustrates that the recovered pcm code values derived from Table 2 for the range 8–15 are accurate within 4 pcm code increments of the "approximated" unattenuated code. Such accuracy as well as the accuracy of the remaining ranges is within an acceptable level. Input speech has been recovered from measurements made at the output of the compression unit 222 by employing the scheme described using Table 2 with good intelligibility.

A reduced version of Table 2 is illustrated in the following Table 4, which also produces good intelligibility:

TABLE 4

Reduced μ-law Log pcm Gain Adjustment Table to Determine Unattenuated pcm Codes

| gain | chord value pcm input signal range [ATx (pcm)] gain code | 0 0 | | 1 2– 3 | 4– 7 | 8– 15 | 1 16– 31 | 2 32– 47 | 3 48– 63 | 4 64– 79 | 5 80– 95 | 6 96– 111 | 7 112– 127 |
|---|---|---|---|---|---|---|---|---|---|---|---|---|---|
| | | | | | | | pcm code adjustments | | | | | | |
| 0.0078125 | 1  | 0 | 47 | 66 | 81 | 92 | 100 | + | + | + | + | + | + |
| 0.0156250 | 2  | * | 34 | 51 | 66 | 76 | 85 | 90 | + | + | + | + | + |
| 0.0234375 | 3  | * | 27 | 42 | 56 | 67 | 76 | 82 | + | + | + | + | + |
| 0.0312500 | 4  | * | 24 | 38 | 51 | 61 | 70 | 77 | x | + | + | + | + |
| 0.0390625 | 5  | * | 20 | 33 | 45 | 55 | 65 | 72 | x | + | + | + | + |
| 0.0546875 | 6  | * | 15 | 27 | 39 | 48 | 57 | 65 | x | + | + | + | + |
| 0.0703125 | 7  | * | 8  | 23 | 34 | 46 | 52 | 59 | x | x | + | + | + |
| 0.0937500 | 8  | * | 7  | 19 | 28 | 37 | 45 | 53 | x | x | + | + | + |
| 0.1328125 | 9  | * | 5  | 14 | 23 | 30 | 38 | 45 | x | x | + | + | + |
| 0.1718750 | 10 | * | *  | 8  | 19 | 25 | 32 | 39 | x | x | x | + | + |
| 0.2343750 | 11 | * | *  | 5  | 14 | 20 | 26 | 32 | x | x | x | + | + |
| 0.3125000 | 12 | * | *  | *  | 7  | 15 | 21 | 26 | x | x | x | x | + |
| 0.4218750 | 13 | * | *  | *  | 5  | 10 | 15 | 19 | x | x | x | x | + |
| 0.5625000 | 14 | * | *  | *  | *  | 5  | 10 | 13 | x | x | x | x | x |
| 0.7500000 | 15 | * | *  | *  | *  | 2  | 4  | 7  | x | x | x | x | x |
| 0.9921875 | 16 | * | *  | *  | *  | *  | *  | 1  | x | x | x | x | x |

Table 4 has only 79 numeric entries which are easily stored in a PLA, ROM or similar hardware memory device, such as the memory device 210 shown in FIG. 2. The values in the prior column with chord value=2 are used for the values at higher gain code settings and at higher chord values (marked x). Preferably, the computer 206 is used to obtain the adjustment values and perform the conversion or addition operation executing appropriate software or assembly code routine. The values in chord ranges 0–1 are repeated from Table 2, except that those values having step value=0 are set to zero, and the values in the chord range 2 from Table 2 are averaged. For example, entries for chord values 2–7 in Table 2 for gain code 14 are 11, 12, 13, 13, 14 and 14, which have an average value of approximately 13, which is shown as chord value 2 in Table 4. Also, some redundant values are eliminated. The use of Table 2 or Table 4 is considerably less complicated than attempting to derive these values using Equations (1) and (2) as described above. Thus, depending upon the desired performance, speech values are recoverable from use of a look-up table having values corresponding to those shown in Tables 2 and 4 or even with a larger non-reduced table with 2048 entries as shown in FIG. 3 for the highest performance.

For lower performance applications, such as the rough averages represented by Equations (3) and (4), a single column of entries from Table 4 is employed. The 16 values used are: {100, 90, 82, 77, 72, 65, 59, 53, 45, 39, 32, 26, 19, 13, 7, 1} for gain codes 1 to 16, corresponding to the adjustment values for chord value 2 in Table 4. Experiments were also performed using two columns from Table 4, one set of values for ATx(pcm) codes which were less than 4, or 0–3, including values: {47, 34, 27, 24, 20, 15, 8, 7, 5, 5, 5, 5, 5, 5, 2, 1}, and the 16 values described above {100, 90, 82, 77, 72, 65, 59, 53, 45, 39, 32, 26, 19, 13, 7, 1} for codes in the range 4–127, for a total of 32 adjustment values. If the pcm code is measured as zero, it is retained as zero. The performance of this method using these listed adjustment values shared an improvement in tracking the signal averages of Equations (3) and (4), but at the cost of a larger look-up table having twice as many table entries as the single column of 16 entries.

Figure 4:
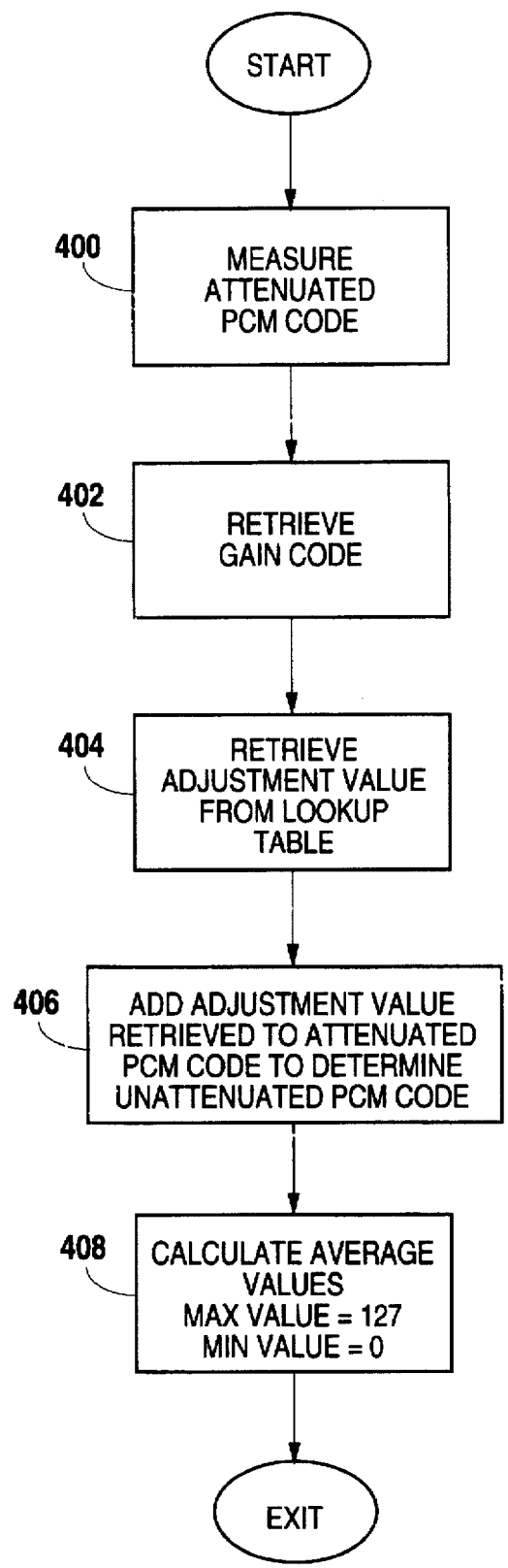
FIG. 4 is a flowchart diagram illustrating the conversion of pcm codes from attenuated to unattenuated format using a lookup table of adjustment values according to the present invention.

Referring now to FIG. 4, a flowchart diagram is shown illustrating a procedure for converting from attenuated to unattenuated pcm codes using the gain code and a lookup table of adjustment values implemented in software or in hardware. The adjustment values are from any one of the lookup tables previously described, including Table 2 having 124 values, Table 4 having 79 values and subsets thereof having as little as 32 or even 16 values. This procedure is preferably performed by the computer 206. In a first step 400, the computer 206 measures an attenuated ATx(pcm) code from the compression unit 222 for the speakerphone circuit 200. Then the computer 206 retrieves the gain code in step 402, which is preferably in a 4-bit or hexadecimal format such as shown in Table 1. In step 404, the computer 206 retrieves the adjustment value from the lookup table within the memory device 210 corresponding to retrieved gain and the attenuated pcm code. In step 406, the computer 206 adds the retrieved adjustment value from lookup table to the attenuated pcm code measured in step 400 to determine the unattenuated pcm code. For example, if gain setting is 6, the value 65 is added to the measured pcm code from step 400. Finally, in step 408, the computer 206 uses the new calculated unattenuated value in the appropriate equations, such as equations (3) and (4). If the new value is greater than 127, which is the maximum allowable μ-law pcm code, the new value is limited to the maximum of 127. Also, values less than zero are retained as zero. Although the above procedure using equations (3) and (4) give a rather rough measure of the unattenuated signal, this measure gives acceptable performance for the calculation of the signal averages.

In addition to being able to recover the unattenuated signal values from their attenuated counterparts, the present invention is employed to perform the reverse process. The reverse process is desirable for converting the received, unattenuated pcm codes Rx(pcm) to the pcm equivalent versions of the attenuated digital signals ARx, referred to as ARx(pcm) codes. In particular, unattenuated pcm code values are measured and adjustment values are retrieved from a lookup table using the measured pcm code and the gain, and the corresponding attenuated signal values are then calculated through subtraction. The attenuated pcm equivalents are desirable for several calculations, including calculations determining a rough measure of the receive signal average in a similar manner as described above for the transmit signal average. In particular, a receive signal average value at a time "t", referred to as $rx\_ave_t$ is determined using the following equations (5) and (6):

$$rx\_ave_t = rx\_ave_{t-1} + \frac{|ARx\,(pcm)| - rx\_ave_{t-1}}{4}, \quad \text{Equation (5)}$$
$$\text{if } |Arx\,(pcm)| \geq rx\_ave_{t-1}$$

$$rx\_ave_t = rx\_ave_{t-1} + \frac{|ARx\,(pcm)| - rx\_ave_{t-1}}{32}, \quad \text{Equation (6)}$$
$$\text{if } |Arx\,(pcm)| < rx\_ave_{t-1}$$

where |ARx(pcm)| is the absolute value of the attenuated signal AKx in pcm code format, and where $rx\_ave_{t-1}$ is the receive signal average at a prior time t−1. Again, the sample rate is preferably 8 kHz. Of course, other equations may be solved using the derived AKx(pcm) codes.

The following Table 5 provides adjustment values for subtracting from the measured unattenuated pcm codes, such as Rx(pcm), to obtain the corresponding attenuated pcm codes, such as ARx(pcm):

TABLE 5

μ-law Log pcm Gain Adjustment Table to Determine Attenuated pcm Codes

| gain | chord value<br>pcm input<br>signal range<br>Rx (pcm)<br>code | 0<br>0–<br>15 | 1<br>16–<br>31 | 2<br>32–<br>47 | 3<br>48–<br>63 | 4<br>64–<br>79 | 5<br>80–<br>95 | 6<br>96–<br>111 | 7<br>112–<br>127 |
|---|---|---|---|---|---|---|---|---|---|
| | | pcm code adjustments | | | | | | | |
| 0.0078125 | 1 | 7 | 23 | 39 | 54 | 69 | 82 | 92 | 100 |
| 0.0156250 | 2 | 7 | 23 | 38 | 53 | 66 | 76 | 84 | 89 |
| 0.0234375 | 3 | 7 | 23 | 38 | 51 | 63 | 71 | 78 | 82 |
| 0.0312500 | 4 | 7 | 23 | 37 | 50 | 60 | 68 | 74 | 77 |
| 0.0390625 | 5 | 7 | 22 | 36 | 49 | 58 | 65 | 70 | 72 |
| 0.0546875 | 6 | 7 | 22 | 35 | 46 | 54 | 60 | 63 | 65 |
| 0.0703125 | 7 | 7 | 21 | 34 | 43 | 51 | 56 | 58 | 60 |
| 0.0937500 | 8 | 7 | 21 | 32 | 40 | 47 | 51 | 53 | 54 |
| 0.1328125 | 9 | 7 | 19 | 29 | 36 | 41 | 44 | 45 | 46 |
| 0.1718750 | 10 | 6 | 18 | 26 | 33 | 37 | 39 | 40 | 41 |
| 0.2343750 | 11 | 6 | 16 | 23 | 28 | 31 | 32 | 33 | 34 |
| 0.3125000 | 12 | 5 | 14 | 20 | 23 | 25 | 26 | 27 | 27 |
| 0.4218750 | 13 | 5 | 11 | 15 | 18 | 19 | 20 | 20 | 20 |
| 0.5625000 | 14 | 4 | 8 | 11 | 12 | 13 | 13 | 14 | 14 |
| 0.7500000 | 15 | 2 | 4 | 6 | 6 | 7 | 7 | 7 | 7 |
| 0.9921875 | 16 | 1 | 1 | 1 | 1 | 1 | 1 | 1 | 1 |

Figure 5:
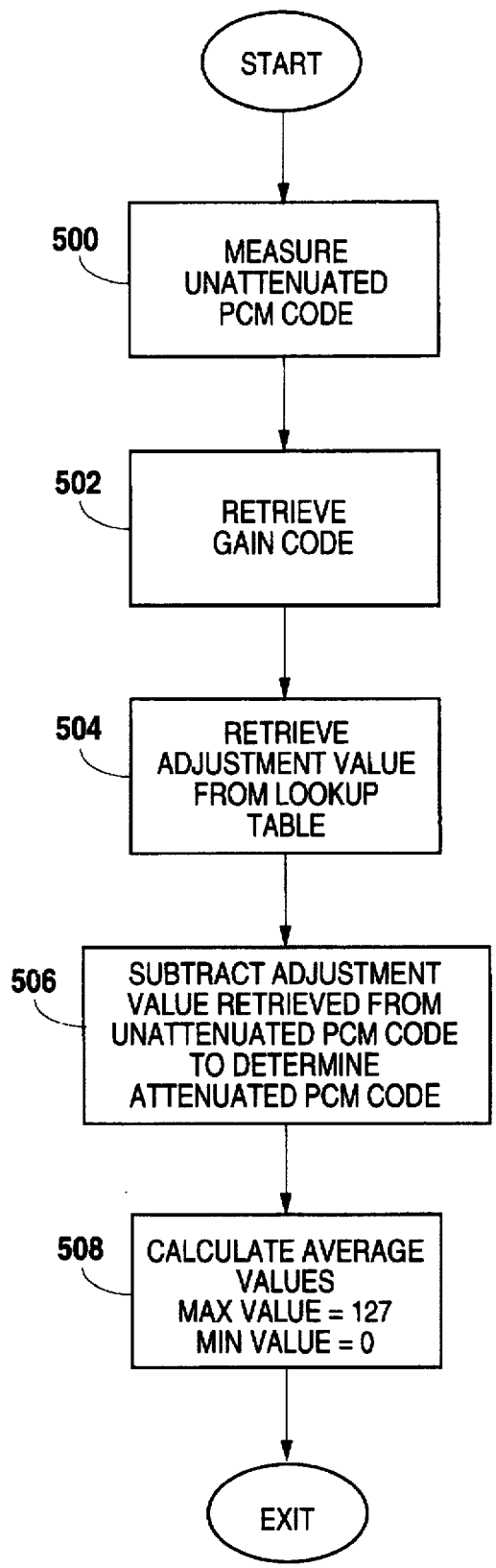
FIG. 5 is a flowchart diagram illustrating the conversion of pcm codes from unattenuated to attenuated format using a lookup table of adjustment values according to the present invention.

Thus, Table 5 is used in a similar manner as the previous tables except that the retrieved adjustment entry is subtracted from the measured unattenuated pcm code to calculate the corresponding attenuated pcm code. For example, if the measured unattenuated code Rx(pcm) is 69 and the gain code is 8, the value 47 is retrieved from Table 5. The retrieved value 47 is subtracted from 69 to determine the attenuated ARx(pcm) code. This represents the pcm equivalent of the linear signal at the output of the receive gain block 230, which is 69−47=22 in this example. FIG. 5 is a flowchart diagram illustrating this reverse process, which is similar to the flowchart of FIG. 4 except that the unattenuated pcm code is measured in step 500, the lookup table used in step 504 is according to Table 5 or a reduced form, and the retrieved adjustment value is subtracted rather than added in step 506.

A binary reduced form of Table 5 is generated by retaining the first column of pcm code adjustments for chord value "0", pcm input signal range "0–15", and generating the columns for chord values "1–7" by subtracting the values from column "0" from columns "1–7" in turn, for each of the 16 gain settings. This effectively produces the following Table 6 which represents the "difference of differences" for each gain setting:

5,715,309

TABLE 6

Difference of Differences Reduced μ-law Log pcm Gain Adjustment Table

| gain | chord value<br>pcm input<br>signal range<br>TX (pcm)<br>code | 0<br>0–<br>15 | 1<br>16–<br>31 | 2<br>32–<br>47 | 3<br>48–<br>63 | 4<br>64–<br>79 | 5<br>80–<br>95 | 6<br>96–<br>111 | 7<br>112–<br>127 |
|---|---|---|---|---|---|---|---|---|---|
|  |  | pcm code adjustments |  |  |  |  |  |  |  |
| 0.0078125 | 1 | 7 | 16 | 16 | 15 | 15 | 13 | 10 | 8 |
| 0.0156250 | 2 | 7 | 16 | 15 | 15 | 13 | 10 | 8 | 5 |
| 0.0234375 | 3 | 7 | 16 | 15 | 13 | 12 | 8 | 7 | 4 |
| 0.0312500 | 4 | 7 | 16 | 14 | 13 | 10 | 8 | 6 | 3 |
| 0.0390625 | 5 | 7 | 15 | 14 | 13 | 9 | 7 | 5 | 2 |
| 0.0546875 | 6 | 7 | 15 | 13 | 11 | 8 | 6 | 3 | 2 |
| 0.0703125 | 7 | 7 | 14 | 13 | 9 | 8 | 5 | 2 | 2 |
| 0.0937500 | 8 | 7 | 14 | 11 | 8 | 7 | 4 | 2 | 1 |
| 0.1328125 | 9 | 7 | 12 | 10 | 7 | 5 | 3 | 1 | 1 |
| 0.1718750 | 10 | 6 | 12 | 8 | 7 | 4 | 2 | 1 | 1 |
| 0.2343750 | 11 | 6 | 10 | 7 | 5 | 3 | 1 | 1 | 1 |
| 0.3125000 | 12 | 5 | 9 | 6 | 3 | 2 | 1 | 1 | 0 |
| 0.4218750 | 13 | 5 | 6 | 4 | 3 | 1 | 1 | 0 | 0 |
| 0.5625000 | 14 | 4 | 4 | 3 | 1 | 1 | 0 | 1 | 0 |
| 0.7500000 | 15 | 2 | 2 | 2 | 0 | 1 | 0 | 0 | 0 |
| 0.9921875 | 16 | 1 | 0 | 0 | 0 | 0 | 0 | 0 | 0 |

The primary benefit of Table 6 over Table 5 is that the entries are expressible using 5-bit values rather than having to use 7 or 8 bits for each table entry as required for Table 5. For Table 6, the initial table entry is retrieved in the same manner as in Table 5, and then added to all the previous entries corresponding to the same gain but with consecutively lower chord values, and the total is then subtracted from the unattenuated measured signal value to obtain the attenuated pcm code. For example, using the same example shown for Table 5, if the unattenuated signal is 69 at gain code 8, the initial table entry in column 4, row 8 is added to all of the previous entries corresponding to chord values 0–3 and gain code 8, and then the total is subtracted from the unattenuated value 69. In particular, the values 7, 8, 11, 14 and 7 in row 8 (or gain code 8) are added to obtain a total of 47, which is then subtracted from 69 to obtain the desired value of 22. It is noted that the reduction of the required memory size outweighs the increase in processing steps or hardware in many applications. Table 6 may further be reduced by replacing the entries having a value of "16" with "15" thereby allowing all entries to be represented by 4-bit binary values ranging from 0 to 15.

Table 6 is rearranged to that shown in the following Table 7:

TABLE 7

Rearranged Reduced μ-law Log pcm Gain Adjustment Table

| gain | A | M | chord value 0 | chord greater than zero pcm code adjustments |  |  |  |  |  |  |  |  |  |  |  |  |  |  |
|---|---|---|---|---|---|---|---|---|---|---|---|---|---|---|---|---|---|---|
|  |  |  | 0 | 1 | 2 | 3 | 4 | 5 | 6 | 7 | 8 | 9 | 10 | 11 | 12 | 13 | 14 | 15 |
| 0.0078125 | 1 | 15 | 7 | 16 |  |  |  |  |  |  |  |  |  |  |  |  |  |  |
| 0.0156250 | 2 | 15 | 7 | 16 | 16 |  |  |  |  |  |  |  |  |  |  |  |  |  |
| 0.0234375 | 3 | 15 | 7 | 15 | 15 | 16 |  |  |  |  |  |  |  |  |  |  |  |  |
| 0.0312500 | 4 | 15 | 7 | 15 | 15 | 15 | 16 |  |  |  |  |  |  |  |  |  |  |  |
| 0.0390625 | 5 | 14 | 7 | 13 | 13 | 13 | 14 | 15 |  |  |  |  |  |  |  |  |  |  |
| 0.0546875 | 6 | 12 | 7 | 10 | 10 | 12 | 13 | 14 | 15 |  |  |  |  |  |  |  |  |  |
| 0.0703125 | 7 | 11 | 7 | 8 | 8 | 8 | 10 | 13 | 13 | 14 |  |  |  |  |  |  |  |  |
| 0.0937500 | 8 | 10 | 7 |  | 5 | 7 | 8 | 9 | 11 | 13 | 14 |  |  |  |  |  |  |  |
| 0.1328125 | 9 | 8 | 7 |  |  | 4 | 6 | 7 | 8 | 9 | 11 | 12 |  |  |  |  |  |  |
| 0.1718750 | 10 | 7 | 6 |  |  |  | 3 | 5 | 6 | 8 | 8 | 10 | 12 |  |  |  |  |  |
| 0.2343750 | 11 | 6 | 6 |  |  |  | 2 | 3 | 5 | 7 | 7 | 8 | 10 |  |  |  |  |  |
| 0.3125000 | 12 | 5 | 5 |  |  |  |  | 2 | 2 | 4 | 5 | 7 | 7 | 9 |  |  |  |  |
| 0.4218750 | 13 | 4 | 5 |  |  |  |  | 2 | 2 | 3 | 4 | 5 | 6 | 6 |  |  |  |  |
| 0.5625000 | 14 | 3 | 4 |  |  |  |  |  | 1 | 1 | 2 | 3 | 3 | 4 | 4 |  |  |  |
| 0.7500000 | 15 | 2 | 2 |  |  |  |  |  |  | 1 | 1 | 1 | 2 | 3 | 3 | 2 |  |  |
| 0.9921875 | 16 | 1 | 1 |  |  |  |  |  |  |  |  | 1 | 1 | 1 | 1 | 1 | 2 | 0 |
|  | 17 | 1 |  |  |  |  |  |  |  |  |  |  | 1 | 1 | 1 | 1 | 0 | 0 |
|  | 18 | 0 |  |  |  |  |  |  |  |  |  |  |  | 0 | 0 | 0 | 1 | 0 |
|  | 19 | 0 |  |  |  |  |  |  |  |  |  |  |  |  | 0 | 1 | 0 | 0 |
|  | 20 | 0 |  |  |  |  |  |  |  |  |  |  |  |  |  | 0 | 0 | 0 |
|  | 21 | 0 |  |  |  |  |  |  |  |  |  |  |  |  |  |  | 0 | 0 |
|  | 22 | 0 |  |  |  |  |  |  |  |  |  |  |  |  |  |  |  | 0 |

The first column marked "A" represents a memory address for an adjustment lookup table implemented in a memory device such as the memory device 210, where the address is calculated by adding the input pcm signal chord value, in the range 1–7, to the gain code which, in this case, is designated as being in the range 0–15 instead of 1–16 as previously used. However, if the input chord value of the pcm signal is 0, then the third column having a chord value "0" is used. The values in the chord column 0 in Table 7 are the same values in Table 6 with chord value=0. The next 16 columns labelled "0–15" relate to the gain codes where the entries in each of these columns are the same 7 entries in each of the gain codes from Table 6. For example, for gain code 7, the 7 entries in Table 6 for chord values 1–7 are {16, 16, 15, 15, 13, 10, 8} which are equivalent to the 7 entries in the column for pcm code adjustment column 0 in Table 7.

The operation of Table 7 is now illustrated using the same example previously used to illustrate Tables 5 and 6. The pcm code "69" has a chord value of "4" at the gain setting of "0.09375." However, this corresponds to gain code 7 in Table 7 rather than gain code 8 as shown in Tables 5 and 6, since the range has been changed from "1–16" to "0–15". To obtain the pcm code for "69" attenuated by gain setting "0.09375" or gain code 7, the gain code 7 is added to the chord value 4 which gives an address value of 11. The initial adjustment value corresponding to address 11 in column "A" and gain code 7 is "7". The remaining adjustment values are obtained by decrementing the memory address by an amount equal to the chord value of "4", in single steps, to successively retrieve table entries "8, 11 and 14". When the chord value decrements to "0", the chord column 0 is used to obtain the final entry corresponding to the gain setting of 0.09375, which is the eighth value down, or "7". If these 5 values, namely {7, 8, 11, 14, 7} are added together and the resulting sum subtracted from the original pcm value of "69", or if the values are successively subtracted from 69, the desired value "22" is obtained.

The mean value under the gain settings 0–15 of each of the 22 rows of Table 7 is calculated and represented by the column marked "M". If the mean value entries in column "M" are used in a similar fashion to generate the attenuated version of pcm code "69", the values obtained successively are {6, 7, 8, 10, 7} where again the last value of 7 is taken from the chord column 0. The sum of these 5 values is 38, which provides a result of 31 when subtracted from "69". This value is a rough estimate of the attenuated version of "69" using the reduced look-up table shown in column "M" and does not, therefore, match up with the prior estimated value of "22". However, the performance of the reduced number of entries in columns "0" and "M" for calculating the signal averages in equations (3) and (4) from Table 7 provides sufficiently acceptable results even though not as accurate as the previous adjustment table values described previously.

The 22 entries from the M column plus the 16 entries of the chord column "0" from Table 7 amount to a total of 38 entries, each representable using only 4 bits. The resulting values and corresponding addresses are provided in the following Table 8:

A calculation using these 38 entries requires up to only seven 8-bit subtractions. This level of resource is easily supplied by the 8-bit microcontroller 207 typically used in a computer for a speakerphone application. The first 16 locations corresponding to addresses 0–15 contain the 16 entries listed in the chord column "0" of Table 7 and are used to supply the last offset value if the chord value of the input pcm code is non-zero, or to supply the only offset value if the input attenuated pcm code is zero. Location 16 is not used, and is preferably set to 0. The 22 remaining entries are stored at address locations 17–38, respectively, with the successive values from column "M" of Table 7.

Figure 6:
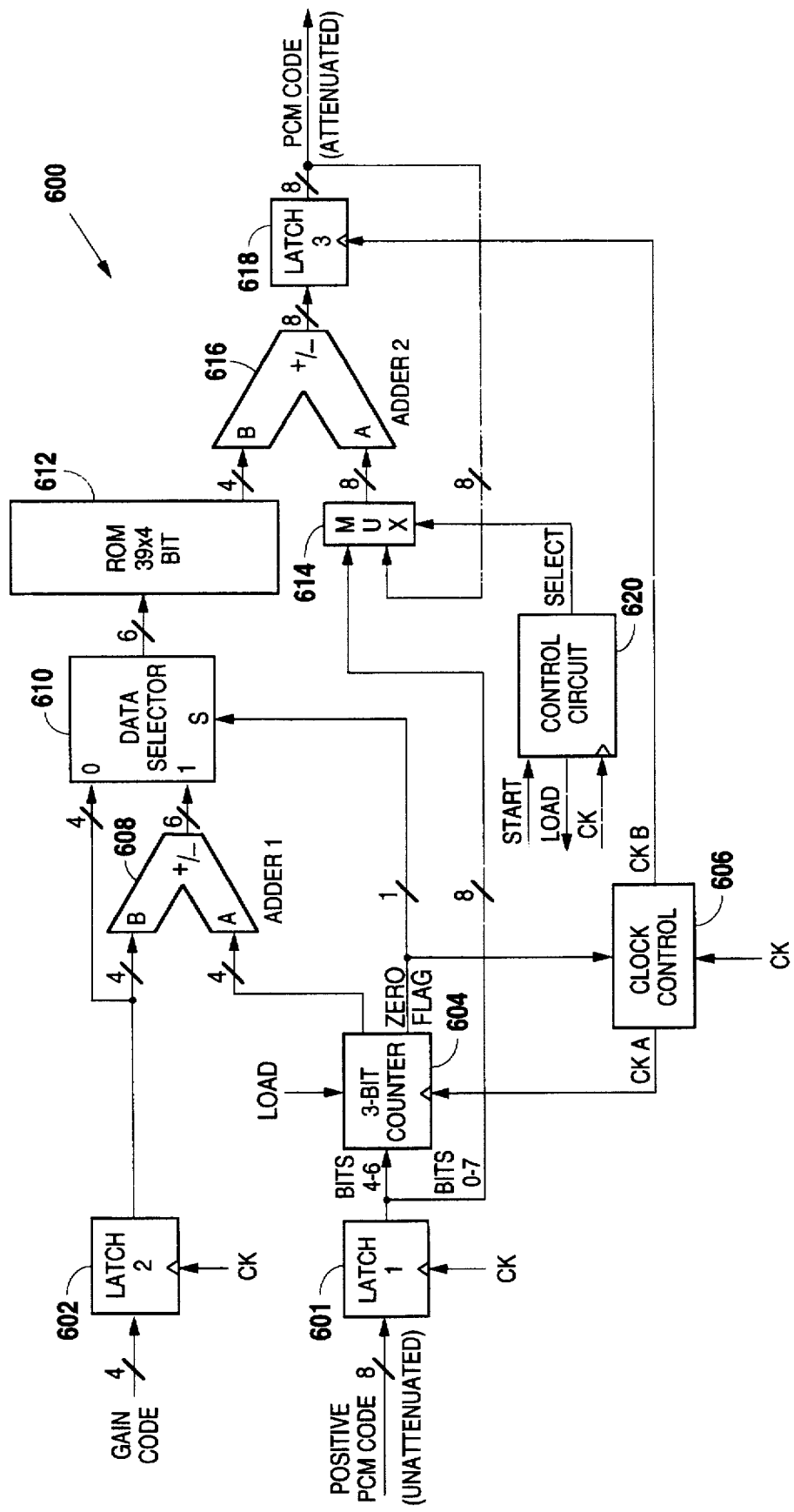
FIG. 6 is a functional block diagram of an adder circuit for retrieving and subtracting successive adjustment values from a lookup table converting pcm codes according to the present invention.

Referring now to FIG. 6, a functional block diagram is shown illustrating an adder circuit 600 using a reduced lookup table memory device to derive attenuated pcm codes given unattenuated pcm codes and gain codes. It is noted that the microcontroller 207 is still used to provide the gain codes and the unattenuated pcm codes and to retrieve the attenuated pcm codes. It is further noted that the microcontroller 207 could interface directly with a memory device, although the microcontroller 207 would then have to output successive memory values, retrieve the corresponding adjustment values and then perform the subtraction calculations.

An 8-bit latch referred to as LATCH1 601 receives the unattenuated pcm code at its input and receives a clock signal CK at its clock input. The chord bits 4–6 of the output of LATCH1 601 are provided to the input of a 3-bit counter 604, which receives a signal LOAD for loading from LATCH1 601 and also receives a signal CKA from a CLOCK CONTROL circuit 606 for initializing the count sequence. The counter 604 is preferably a down counter which decrements by 1 with each pulse of the CKA signal. The counter 604 asserts the ZERO FLAG signal low when terminal count is reached, which occurs when the counter 604 reaches 0. The CLOCK CONTROL circuit 606 is activated when the ZERO FLAG signal is asserted high or at logic "1", and correspondingly asserts pulses on clock signals CKA and CKB synchronized with CK. Otherwise, the ZERO FLAG signal is asserted low. In the embodiment shown, the CLOCK CONTROL circuit 606 asserts a maximum of 7 CKA cycles and 8 CKB cycles. When the ZERO FLAG signal is asserted low, however, the CLOCK CONTROL circuit 606 stops asserting cycles on CKA and asserts one more clock pulse on CKB to complete calculations.

A LATCH2 602 receives the 4-bit gain code at its input and also receives the CK signal at its clock input for latching the gain code. The three output bits of the counter 604 are provided to the A input of an adder, referred to as ADDER1 608, which receives a 4-bit gain code value at its B input from the LATCH2 602. The remaining higher input bits of the A input to ADDER1 608, if any, are set to zero. The fifth bit or bit 4 of the B input of ADDER1 608 input is set to logic "1" so that the B input of ADDER1 608 is always set to 16 plus the value of the gain code, resulting in a range of

TABLE 8

| | Memory Contents | | | | | | | | | | | | | | | | | | | |
|---|---|---|---|---|---|---|---|---|---|---|---|---|---|---|---|---|---|---|---|---|
| Address | 0 | 1 | 2 | 3 | 4 | 5 | 6 | 7 | 8 | 9 | 10 | 11 | 12 | 13 | 14 | 15 | 16 | 17 | 18 | 19 |
| Contents | 7 | 7 | 7 | 7 | 7 | 7 | 7 | 7 | 7 | 6 | 6 | 5 | 5 | 4 | 2 | 1 | 0 | 15 | 15 | 15 |
| Address | 20 | 21 | 22 | 23 | 24 | 25 | 26 | 27 | 28 | 29 | 30 | 31 | 32 | 33 | 34 | 35 | 36 | 37 | 38 | |
| Contents | 15 | 14 | 12 | 11 | 10 | 8 | 7 | 6 | 5 | 4 | 3 | 2 | 1 | 1 | 0 | 0 | 0 | 0 | 0 | |

16–31. The output of LATCH2 602 is also provided to the "0" input of a data selector 610, which receives six output bits from the ADDER1 608 at its "1" input and receives the ZERO FLAG signal at its select input. The six output bits of the data selector 610 are provided to the address input of a memory device 612, which is preferably a 39×4-bit ROM for storing the 4-bit adjustment values listed in Table 8. The four output bits of the ROM 612 are provided to the B input of an 8-bit adder, referred to as ADDER2 616, which provides its eight output bits to the input of an 8-bit latch, referred to as LATCH3 618, which is clocked by CKB. The ADDER2 616 subtracts its B input from its A input or ("A–B"), and the result is latched into the LATCH3 618 upon a pulse of CKB, where the LATCH3 618 provides the attenuated pcm code at its output (after all cycles are complete). The attenuated pcm code from the LATCH3 618 is provided to the "1" input of a multiplexer (mux) 314, which receives a signal SELECT at its SELECT input. The mux 614 receives the 8-bit output of LATCH1 601 at its "0" input.

A control circuit 620 preferably receives a signal START to begin each calculation and also receives the CK signal for synchronization, and correspondingly asserts the SELECT and LOAD signals to control operation. It is noted, however, that the microcontroller 207 could perform the functions of the control circuit 620, which would then not be necessary. An external device, such as the microcontroller 207, supplies a gain code at the input of the LATCH2 602 and a positive, unattenuated pcm code at the input of the LATCH1 601, and then asserts the START signal high for at least one CK cycle. The gain code and the unattenuated pcm code should not be changed until the adder circuit 600 has completed calculations. Alternatively, LATCH1 601 and LATCH2 602 should be clocked only once to isolate changes at the input during operation. LATCH1 601 and LATCH2 602 latch the pcm and gain codes, respectively, during a first CK cycle. The control circuit 620 then asserts the LOAD signal high during the first CK cycle long enough to load the pcm code from the LATCH1 601 into the counter 604. This is preferably completed for the second CK cycle in the embodiment shown. The LOAD signal is negated in time for the signals to propagate through the circuit so that the ADDER2 616 performs the first subtraction during the second CK cycle. The LOAD signal remains negated for the remainder of the operation. In an alternative embodiment, the chord value (bits 6–4 of pcm code) are provided directly to the input of the counter 604, so that the chord value is loaded into the counter 604 on the first CK cycle. This would allow operation to complete one CK cycle sooner. In the embodiment shown, the control circuit 620 asserts the SELECT signal high on the third CK cycle and keeps the SELECT signal high for the remainder of the operation.

Operation is as follows. At the beginning of each conversion, the control circuit 620 asserts the SELECT to logic "0", thereby selecting the output of the LATCH1 601 as the A operand of the ADDER2 616. The unattenuated pcm code is loaded into LATCH1 601 and the 4-bit gain code is loaded into the LATCH2 602 during the first CK cycle. The chord value from LATCH1 601 is loaded into the COUNTER 604 during the first and second CK cycles. If the chord value is greater than zero, the ZERO FLAG signal is asserted during the second CK cycle, thereby activating the CLOCK CONTROL circuit 606, which asserts clock signals CKA, CKB synchronously with the CK signal beginning during the third CK cycle. While the ZERO FLAG signal is asserted, the ADDER1 608 adds the gain code to the chord value for providing an address to the ROM 612. The CKA signal allows the counter 604 to count down to access successive locations in the ROM 612. The control circuit 620 negates the SELECT signal for the third CK cycle, so that the output of the LATCH3 618 is provided to the A input of the ADDER2 616 for the remaining CK cycles. In this manner, the first accessed location from the ROM 612 is subtracted from the unattenuated pcm code during the second CK cycle, and subsequent accessed values from the ROM 612 are successively subtracted from the result on following successive cycles of CK. If the chord value is initially zero or when it goes to zero, the ZERO FLAG signal is asserted to logic "0" so that the 4-bit gain code from the LATCH2 602 provides the address to the ROM 612. The CLOCK CONTROL circuit 606 asserts one last CKB cycle to latch the final subtraction of the ADDER2 616 associated with a chord value of zero to the output of the LATCH3 618.

An example of the chord value being zero is described first. If the unattenuated pcm code is 12 having a chord value of "0", and the gain is set at "0.09375", or code 7, the SELECT and ZERO FLAG signals are both zero. The address provided to the ROM 612 is 7, which provides an adjustment value of 7 to the B input of the ADDER2 616. The mux 614 asserts the output of the LATCH1 601 to the A input of the ADDER2 616. Thus, the A and B inputs of ADDER2 616 are 12 and 7, respectively. The ADDER2 616 performs the subtraction A–B and asserts the value 5, which is latched by the LATCH3 618 with the first and only pulse on CKB as the estimate of the attenuated pcm code. The true value of the attenuated code for pcm code 12 is 2. It should be noted that since the table values are mean differences for each chord value, it is possible that the LATCH3 618 asserts a negative value from the ADDER2 616. Negative values are preferably discarded in the preferred embodiment and replaced with the "0" pcm code.

Figure 7:
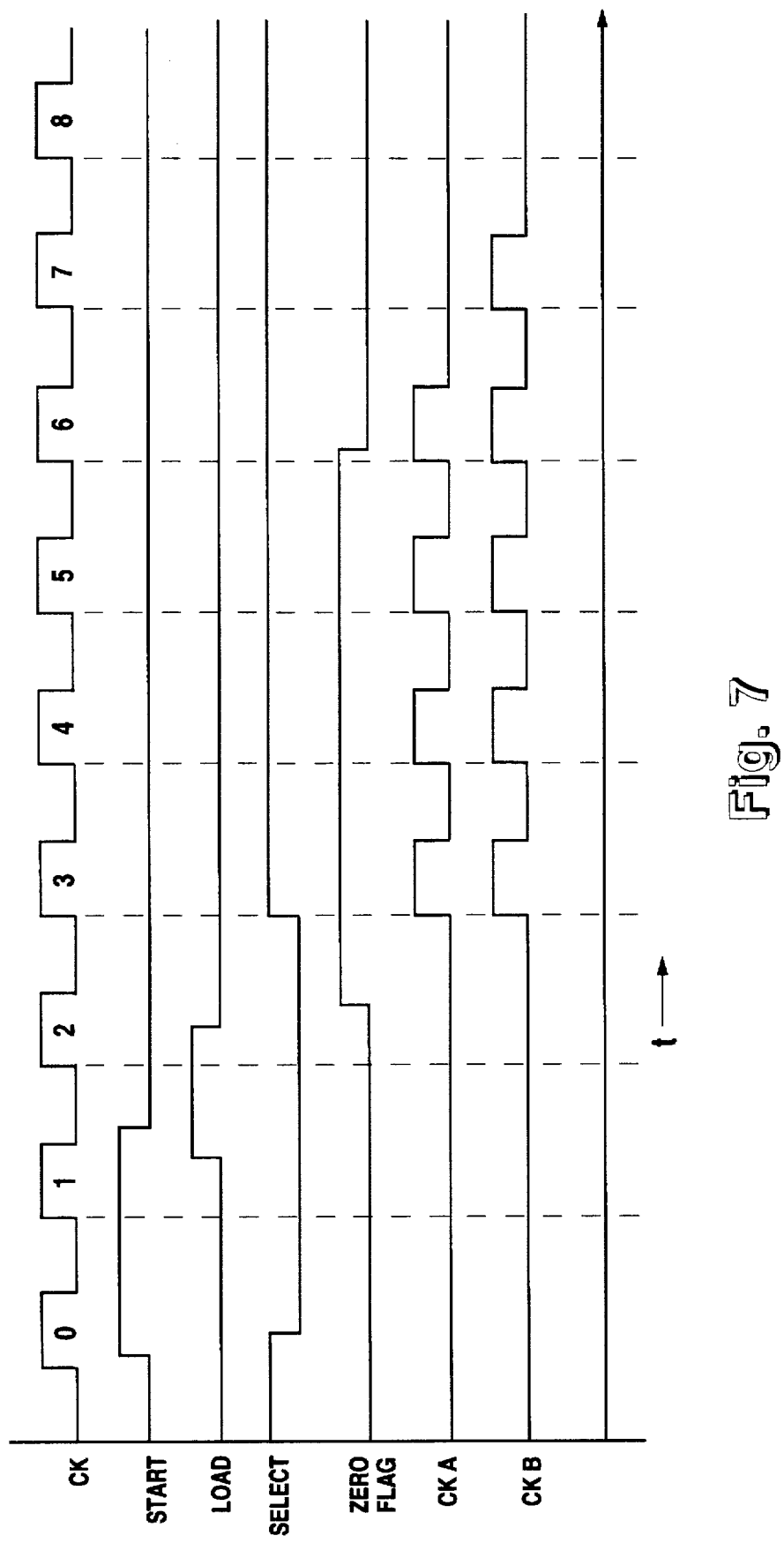
FIG. 7 is a timing diagram illustrating operation of the adder circuit of FIG. 6.

To illustrate operation for the non-zero case, the same example used for Tables 5, 6 and 7 is chosen using an unattenuated pcm code of 69 and a gain setting of 0.09375 or gain code 7. FIG. 7 is a timing diagram illustrating the operation of the adder circuit 600 of FIG. 6 for the non-zero case. The gain and pcm codes are loaded into LATCH1, LATCH2 601, 602 on the first CK cycle. The pcm code 69 has a chord value of "4" which is loaded into the COUNTER 604 for the second CK cycle. The ZERO FLAG is set to logic "1", which configures the DATA SELECTOR 610 to supply the ROM 612 with an address from the output of the ADDER1 608 on the second CK cycle. The B input of ADDER1 608 is "7+16"since bit 4 of input is set to logic "1", and the A input of ADDER1 608 is "4", being the output of the COUNTER 604. Thus, the output of ADDER1 608 is "7+16+4" or "27" which is provided to the address input of the ROM 612 from the DATA SELECTOR 610. The control circuit 620 initially asserts SELECT low, so that the A input of ADDER2 616 is supplied with the output of LATCH1 601, which is "69". The B input of ADDER 616 is provided from the first adjustment value at address "27" of the ROM 312, which is an adjustment value of "6".

On the third cycle of CK, CKA and CKB are active, so that CKA decrements the COUNTER 604 from "4" to "3" and CKB latches the output of ADDER2 616, which is (69–6) or "63" into LATCH3 618. The SELECT signal is at logic "1", so that the output of LATCH3 618 is provided to the A input of ADDER2 616 by the mux 614 for the remainder of the operation.

Since the COUNTER 604 was decremented, the address provided to the ROM 612 is decremented to point to the entry at address "26", which is "7". Thus, the B input of the ADDER2 616 changes to "7" and the A input is now "63", the contents of LATCH3 318. Operation continues in like manner for the next two CK cycles, where the consecutive addresses to the ROM 612 are 25 and 24 for asserting the values 8 and 10, respectively, where these values are consecutively subtracted and the result latched into the LATCH3 618 on consecutive cycles of CKB. On the next or sixth CK cycle, the counter 604 decrements to zero, the ZERO FLAG signal is set to logic "0", so that an address of 7 from the LATCH2 602 is provided to the ROM 612. The ROM 612 asserts the corresponding value 7. The CLOCK CONTROL circuit 606 asserts a final CKB signal to perform the final subtraction of 7 from the output of the ADDER2 616, to achieve the final value, which is the estimated attenuated pcm code. These operations are summarized as follows:

Cycle 1 of CK: LATCH1 loaded with unattenuated pcm code, LATCH2 loaded with gain code.

Cycle 2 of CK: COUNTER LOADS CHORD VALUE=4.

Cycle 3 of CK: ADDER2 69–6=63; COUNTER 4–1=3; ROM ADDRESS 27–1=26.

Cycle 4 of CK: ADDER2 63–7=56; COUNTER 3–1=2; ROM ADDRESS 26–1=25.

Cycle 5 of CK: ADDER2 56–8=48; COUNTER 2–1=1; ROM ADDRESS 25–1=24.

Cycle 6 of CK: ADDER2 48–10=38; COUNTER 1–1=0; ROM ADDRESS 7.

Cycle 7 of CK: ADDER2 38–7=31.

Note that the final CKB latches the output of ADDER2 616, which subtracts "7" from "38" giving a final result of "31" latched into the LATCH3 618 on the rising edge of the seventh CK cycle. The value 31 is the same as the estimate of the attenuated version of "69" using the reduced look-up table using column "M" of table 7.

The microcontroller 207 is capable of performing the functions of the circuit by employing a ROM, ALU, PLA, etc. and software using the reduced look-up table of mean differences defined in Tables 7 or 8. The same mechanism is preferably used to perform pcm conversions for the A-law case by using entries corresponding to A-law in the look-up table rather than the μ-law values described. Operation for the A-law case is essentially identical. The present invention therefore provides conversion of pcm codes between attenuated and unattenuated values, and vice-versa, employing simple 8-bit arithmetic and reduced look-up tables rather than using log pcm-to-linear and linear-to-log pcm conversions, multiplication and inverse natural logarithms plus considerable computation on the part of a microcontroller.

The method for recovering unattenuated pcm codes from attenuated codes allows unattenuated speech to be resynthesized from the attenuated version with reasonable intelligibility using simple hardware and software. Experiments using the disclosed methods and gain settings produced attenuation of up to approximately 35 dB, where the recovered speech was still intelligible and thus satisfactory for many practical applications.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A conversion system for receiving compressed pcm codes and for determining corresponding uncompressed pcm codes for a digital signal processing system having a gain device, the conversion system comprising:

means for measuring compressed pcm codes;

means for receiving gain codes of the gain device;

a memory device for storing a lookup table of predetermined adjustment values corresponding to said measured pcm codes and said gain codes, said adjustment values for converting said measured pcm codes to corresponding uncompressed digital values in pcm code format;

means for retrieving said adjustment values from said memory device using said measured pcm codes and corresponding gain codes; and means for calculating said uncompressed digital values in pcm code format using said measured pcm codes and said measured adjustment values.

2. The conversion system of claim 1, wherein the digital signal processing system includes a logarithmic compression device and wherein the gain device provides attenuated linear digital signals to the logarithmic compression device for converting the attenuated linear signals to said measured pcm codes, further comprising:

said memory device storing adjustment values for converting compressed and attenuated pcm codes to uncompressed and unattenuated pcm codes; and wherein said calculating means adds said adjustment values to said measured pcm codes for converting to corresponding uncompressed and unattenuated pcm codes.

3. The conversion system of claim 2, wherein the logarithmic compression device performs a piecewise linear approximation of a logarithmic compression characteristic.

4. The conversion system of claim 3, wherein said piecewise linear approximation is the μ-law compression characteristic.

5. The conversion system of claim 3, wherein said piecewise linear approximation is the A-law compression characteristic.

6. The conversion system of claim 1, wherein the digital signal processing system includes an expansion device for converting said measured pcm codes to linear digital signals provided to the gain device, further comprising:

said memory device storing adjustment values for converting compressed and unattenuated pcm codes to uncompressed and attenuated pcm codes; and wherein said calculating means subtracts said adjustment values from said measured pcm codes for converting to corresponding uncompressed and attenuated pcm codes.

7. The conversion system of claim 6, wherein the logarithmic expansion device converts values according to a piecewise linear approximation of a logarithmic compression characteristic.

8. The conversion system of claim 1, wherein said measuring, receiving, retrieving and calculating means includes a microcontroller.

9. The conversion system of claim 1, wherein said memory device comprises a read only memory.

10. The conversion system of claim 1, wherein there are a predetermined number of gain codes and a predetermined number of pcm codes within a predetermined range of pcm codes.

11. The conversion system of claim 10, wherein said predetermined number of gain codes is sixteen, and wherein said lookup table includes an averaged adjustment value for each of said sixteen gain codes for a total of sixteen adjustment values.

12. The conversion system of claim 10, wherein for each one of said predetermined number of gain codes, said lookup table includes an adjustment value for each one of said predetermined number of pcm codes.

13. The conversion system of claim 12, wherein said predetermined number of gain codes is sixteen and said predetermined number of pcm codes is 128 or less.

14. The conversion system of claim 10, wherein said predetermined range of said pcm codes is divided into a plurality of subranges, and wherein for each one of said predetermined number of gain codes, said lookup table includes an averaged adjustment value for each one of said plurality of subranges.

15. The conversion system of claim 14, wherein said plurality of subranges is based on a chord value of said measured pcm codes.

16. The conversion system of claim 15, wherein there are eight of said subranges corresponding to eight respective chord values.

17. The conversion system of claim 16, wherein said predetermined number of gain codes is sixteen and wherein there are eight subranges of pcm codes corresponding to eight respective chord values, wherein for each one of said sixteen gain codes, said lookup table includes one adjustment value for a chord value of less than four and another adjustment value for a chord value of four or more for a total of 32 adjustment values.

18. The conversion system of claim 15, wherein there are twelve subranges corresponding to eight chord values and five step values when said chord value is zero.

19. The conversion system of claim 14, wherein:
said lookup table stores difference of differences of said adjustment values; and
said calculating means comprises an adder circuit for retrieving and adding successive difference values from said memory device in successive cycles for calculating each one of said adjustment values.

20. The conversion system of claim 19, wherein said adder circuit comprises:
a first latch for latching said measured pcm code;
a second latch for latching said gain code;
a counter coupled to said first latch for retrieving a chord value from said measured pcm code and for providing a count value; and
an adder coupled to said second latch and said counter for adding said gain code to said count value for providing successive address values to said memory device for retrieving said successive difference values.

21. The conversion circuit of claim 20, further comprising:
a third latch for storing intermediate values and for providing convened pcm codes;
a multiplexer receiving values from said first and third latches for providing selected values;
a second adder coupled to said multiplexer and said memory device for combining said successive difference values from said memory device with said selected values from said multiplexer; and
select and control logic providing a select signal to said multiplexer for selecting between said first and third latches.

22. The conversion circuit of claim 21, wherein said select logic selects said first latch during a first cycle of said adder circuit to retrieve said measured pcm code, and then selects said third latch for the remaining cycles for combining said successive difference values for calculating an adjustment value.

23. The conversion circuit of claim 21, wherein said second adder subtracts said successive difference values from said selected values during successive cycles of operation for converting unattenuated pcm codes to attenuated pcm codes.

24. The conversion system of claim 10, wherein said predetermined range of said pcm codes is divided into twelve subranges corresponding to eight chord values and five step values when said chord value is zero, wherein said predetermined number of gain codes is sixteen, and wherein for each one of said sixteen gain codes, said lookup table includes up to a maximum number of averaged adjustment values, wherein said maximum number is less than twelve.

25. The conversion system of claim 24, wherein said maximum number is eight, so that said lookup table includes up to 128 adjustment values.

26. The conversion system of claim 24, wherein said maximum number is six, so that said lookup table includes up to 96 adjustment values.

27. The conversion system of claim 1, wherein the gain device comprises a digital multiplier for attenuating digital signals according to one of a plurality of predetermined gain settings.

28. A conversion system for determining uncompressed digital signals in pcm code format from compressed pcm codes for a speakerphone circuit, the speakerphone circuit including a microphone for detecting speech, an analog to digital converter for sampling speech signals and providing the uncompressed digital signals, a gain device for attenuating the digital signals according to a plurality of predetermined gain settings, and a logarithmic compression device for converting the attenuated digital signals to the compressed pcm codes, said conversion system comprising:
a memory device for storing a lookup table of predetermined adjustment values corresponding to the attenuated and compressed pcm codes and a plurality of gain codes corresponding to the plurality of gain settings, wherein each one of said adjustment values is an approximation of the difference between the pcm codes from said compression device and pcm code equivalents of the unattenuated and uncompressed digital signals provided to the gain device; and
a control device coupled to said memory device and for coupling to the speakerphone circuit, said control device comprising:
means for measuring the compressed pcm codes provided by the logarithmic compression device;
means for receiving said gain settings defining the gain of the gain device;
means for retrieving said adjustment values from said memory device using said gain codes and said measured pcm codes; and
means for adding said retrieved adjustment values to said measured pcm codes to determine said unattenuated and uncompressed pcm code equivalents.

29. The conversion system of claim 28, wherein the logarithmic compression device performs a piecewise linear approximation of a logarithmic compression characteristic.

30. The conversion system of claim 28, wherein said lookup table includes 128 adjustment values for each of sixteen predetermined gain settings.

31. The conversion system of claim 28, wherein said lookup table includes sixteen averaged adjustment values, one for each of sixteen predetermined gain settings.

32. The conversion system of claim 28, wherein the pcm codes are divided into eight subranges based on chord values and wherein there are sixteen predetermined gain settings.

33. The conversion system of claim 32, wherein for each one of said sixteen gain settings, said lookup table includes one averaged adjustment value for chord values less than four and another averaged adjustment value for chord values of four or more for a total of 32 averaged adjustment values.

34. The conversion system of claim 28, wherein the range of said pcm codes is between 0 and 127 inclusive, which is divided into twelve separate subranges based on chord and step values, wherein said memory device stores a reduced lookup table comprising an averaged adjustment value for each of said twelve subranges for each of sixteen predetermined gain settings.

35. The conversion system of claim 34, wherein said twelve subranges comprise eight chord ranges wherein the first zero subrange is further divided into five step subranges.

36. A conversion system for converting compressed and unattenuated pcm codes to uncompressed and attenuated pcm codes for a speakerphone circuit, the speakerphone circuit including a logarithmic expansion device for converting the unattenuated pcm codes to digital signals, a gain device for attenuating said digital signals according to a plurality of predetermined gain settings, a digital to analog converter for converting the attenuated digital signals to analog signals and an amplifier for providing the analog signals to a loudspeaker, the conversion system comprising:

a memory device for storing a lookup table of predetermined adjustment values corresponding to the compressed and unattenuated pcm codes and a plurality of gain codes corresponding to the plurality of gain settings, wherein each one of said adjustment values is an approximation of the difference between the compressed and unattenuated pcm codes and pcm code equivalents of the uncompressed and attenuated digital signals; and a control device coupled to said memory device and for coupling to the speakerphone circuit, comprising:

means for measuring the compressed and unattenuated pcm codes provided to the expansion device;

means for asserting said gain settings to define the gain of the gain device;

means for retrieving said adjustment values from said memory device using said gain codes and said measured pcm codes; and means for subtracting said retrieved adjustment values from said measured pcm codes to determine said uncompressed and attenuated pcm code equivalents.

37. The conversion system of claim 36, wherein the logarithmic expansion device performs expansion according to a piecewise linear approximation of a logarithmic compression characteristic.

38. The conversion system of claim 36, wherein said memory device stores 128 adjustment values for each of sixteen predetermined gain settings.

39. The conversion system of claim 36, wherein the range of said pcm codes is between 0 and 127 inclusive, which is divided into eight separate subranges based on a chord value, wherein said memory device stores a reduced lookup table comprising an averaged adjustment value for each of said eight subranges for each of sixteen predetermined gain settings.

40. The conversion system of claim 39, wherein said averaged adjustment values of said lookup table are difference of difference values.

41. The conversion system of claim 39, wherein said lookup table is further reduced to sixteen averaged adjustment values corresponding to a chord value of zero plus 22 mean adjustment values for non-zero chord values calculated as the mean of the difference of differences values added to corresponding binarily reduced gain codes.

* * * * *